US009922503B2

(12) United States Patent
Jasper et al.

(10) Patent No.: US 9,922,503 B2
(45) Date of Patent: Mar. 20, 2018

(54) COOPERATING REELS

(71) Applicant: Aristocrat Technologies Australia Pty Limited, North Ryde (AU)

(72) Inventors: Steven Alan Jasper, Henderson, NV (US); Jamie Keith Langille, Las Vegas, NV (US)

(73) Assignee: ARISTOCRAT TECHNOLOGIES AUSTRALIA PTY LIMITED, North Ryde (AU)

( * ) Notice: Subject to any disclaimer, the term of this patent is extended or adjusted under 35 U.S.C. 154(b) by 448 days.

(21) Appl. No.: 14/139,275

(22) Filed: Dec. 23, 2013

(65) Prior Publication Data

US 2014/0113700 A1 Apr. 24, 2014

Related U.S. Application Data

(63) Continuation of application No. 12/336,214, filed on Dec. 16, 2008, now Pat. No. 8,657,667.

(51) Int. Cl.
*A63F 13/00* (2014.01)
*G07F 17/34* (2006.01)

(52) U.S. Cl.
CPC .................................... *G07F 17/34* (2013.01)

(58) Field of Classification Search
CPC ............. G07F 17/3213; G07F 17/3262; G07F 17/3279; G07F 17/3293
USPC ........................................... 463/9, 12, 16, 20
See application file for complete search history.

(56) References Cited

U.S. PATENT DOCUMENTS

| | | | | |
|---|---|---|---|---|
| 5,605,504 | A | 2/1997 | Huang | |
| 6,227,969 | B1 * | 5/2001 | Yoseloff .................... | A63F 1/18 273/143 R |
| 6,517,437 | B1 | 2/2003 | Wells et al. | |
| 6,523,829 | B1 | 2/2003 | Walker et al. | |
| 6,685,563 | B1 * | 2/2004 | Meekins ................. | G07F 17/32 273/138.2 |
| 6,959,928 | B2 | 11/2005 | Schultz | |
| 7,204,754 | B2 | 4/2007 | Gray et al. | |
| 7,794,320 | B2 | 9/2010 | Baerlocher et al. | |
| 2004/0097280 | A1 | 5/2004 | Gauselmann | |

(Continued)

FOREIGN PATENT DOCUMENTS

WO 1997-26061 A1 † 7/1997

OTHER PUBLICATIONS

United States Patent and Trademark Office, "Non-Final Office action", issued in connection with U.S. Appl. No. 12/336,214, dated Jun. 3, 2011, 16 pages.

(Continued)

*Primary Examiner* — James S McClellan
(74) *Attorney, Agent, or Firm* — Armstrong Teasdale LLP

(57) ABSTRACT

Certain embodiments provide systems, methods, and apparatus for game play, including cooperative reel and/or symbol game play. A method includes initiating a game for play by a player at a gaming system. The method also includes determining a player combination of one or more symbols. The method further includes determining a dealer combination of one or more symbols. Additionally, the method includes comparing the player combination and the dealer combination to determine a result. The method includes outputting the result to the gaming system for player view.

32 Claims, 11 Drawing Sheets

(56) References Cited

U.S. PATENT DOCUMENTS

| | | | | |
|---|---|---|---|---|
| 2005/0054420 | A1 | 3/2005 | Cregan et al. | |
| 2005/0153775 | A1 | 7/2005 | Griswold et al. | |
| 2006/0052148 | A1 * | 3/2006 | Blair, Jr. | G07F 17/3293 463/13 |
| 2006/0058097 | A1 | 3/2006 | Berman et al. | |
| 2006/0258446 | A1 | 11/2006 | Nguyen et al. | |
| 2007/0135193 | A1 | 6/2007 | Nicely | |
| 2008/0214283 | A1 | 9/2008 | Cregan et al. | |
| 2008/0227513 | A1 | 9/2008 | Yoshizawa | |
| 2008/0227514 | A1 † | 9/2008 | Yoshizawa | |
| 2010/0099480 | A1 * | 4/2010 | Caputo | G07F 17/32 463/12 |
| 2010/0151931 | A1 | 6/2010 | Jasper et al. | |

OTHER PUBLICATIONS

United States Patent and Trademark Office, "Final Office action", issued in connection with U.S. Appl. No. 12/336,214, dated Feb. 16, 2012, 21 pages.

United States Patent and Trademark Office, "Non-Final Office action", issued in connection with U.S. Appl. No. 12/336,214, dated Jun. 19, 2013, 5 pages.

United States Patent and Trademark Office, "Notice of Allowance", issued in connection with U.S. Appl. No. 12/336,214, dated Oct. 8, 2013, 24 pages.

* cited by examiner
† cited by third party

COOPERATING REELS

CROSS-REFERENCE TO RELATED APPLICATIONS

The present application claims, as a continuation, the benefit of priority of U.S. patent application Ser. No. 12/336,214 filed on Dec. 16, 2008, entitled "COOPERATING REELS", which is herein incorporated by reference in its entirety.

FIELD

The present invention relates to a gaming system, a method of gaming, a game controller and computer program code.

BACKGROUND

In the casino industry, gaming machines, such as slot machines, fruit machines, or poker machines, have in recent years become one of the more popular, exciting, and sophisticated wagering activities available at casinos and other gambling locations. At the same time, gaming machines have also become a source of greater revenue for gaming establishments.

It is known to provide a gaming system such as a video slot machine wherein symbols are displayed as a plurality of virtual reels on a video display. Each reel comprises a plurality of symbols arranged in a predetermined sequence. Typically, when a reel stops, a plurality of symbols of each reel are visible on the display. For example, three symbols of each reel. While the stopping position of the reel can be chosen in a number of different ways, in all cases, the symbols which stop in the display are adjoining symbols in the symbol sequence. Typically, when spinning of the reels is simulated, symbols before the stopped symbols in the symbol sequence will be visible at least as the reel comes to a stop.

SUMMARY OF THE INVENTION

Certain embodiments provide systems, methods, and apparatus for game play, including cooperative reel and/or symbol game play.

Certain embodiments provide a method of gaming. The method includes providing for initiating a game for play by a player at a gaming system. The method also includes determining a player combination of one or more symbols. The method further includes determining a dealer combination of one or more symbols. Additionally, the method includes comparing the player combination and the dealer combination to determine a result. The method includes outputting the result to the gaming system for player view.

Certain embodiments provide a computer readable medium comprising computer program code which when executed implements a method of gaming. The method executed based on the computer program code includes initiating a game for play by a player at a gaming system. The method also includes determining a player combination of one or more symbols. The method further includes determining a dealer combination of one or more symbols. Additionally, the method includes comparing the player combination and the dealer combination to determine a result. The method includes outputting the result to the gaming system for player view.

Certain embodiments provide a game controller for game play with a gaming system. The game controller is arranged to initiate a game for play by a player at a gaming system. The game controller is arranged to determine a player combination of one or more symbols. The game controller is also arranged to determine a dealer combination of one or more symbols. The game controller is arranged to compare the player combination and the dealer combination to determine a result. The game controller is arranged to output the result to the gaming system for player view.

Certain embodiments provide a gaming system. The gaming system includes a player interface including a display for viewing by a player. The gaming system also includes a game controller. The game controller is arranged to initiate a game for play by a player via the player interface. The game controller is arranged to determine a player combination of one or more symbols. The game controller is also arranged to determine a dealer combination of one or more symbols. The game controller is arranged to compare the player combination and the dealer combination to determine a result. The game controller is arranged to output the result to the player interface for player view.

Figure 1:
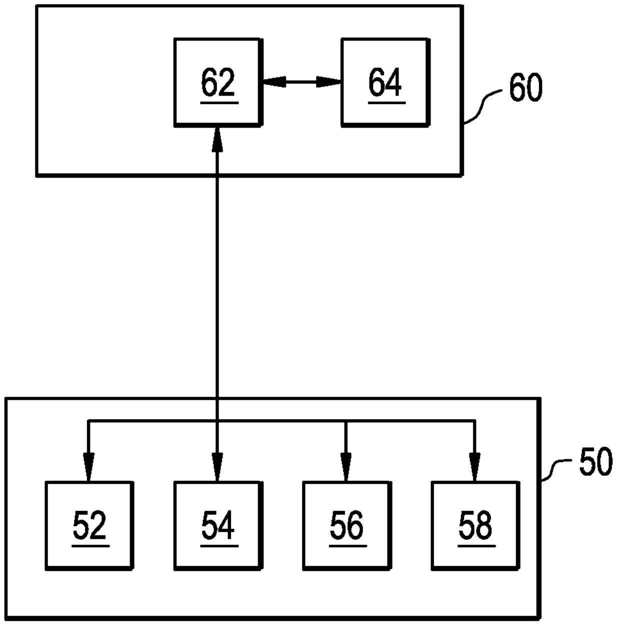
FIG. 1 is a block diagram of the core components of a gaming system.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

A game, such as a casino game, and one or more related systems and methods may be provided to combine features of table games and slot or video poker games. For example, in a game executed on a gaming system, a set of symbols appears on one or more reels. One or more of the reels and/or additional symbols position(s) is assigned to be a "dealer". The special set of symbols on the non-dealer reels are cooperating with and/or competing against the dealer symbols to form one or more winning combinations.

As an example, a gaming system is provided that implements a spinning reel game including a plurality of reels having a plurality of symbols in a designated symbol sequence. The gaming system has a game controller which implements a game in which one or more symbols are selected independent of the symbol sequence for display whereby the displayed symbols of each reel may be non-adjacent symbols. The display of spinning of the reels is controlled such that during at least part of the display of spinning, the reel is displayed as spinning in the symbol sequence relative to the display positions. In an example, this is achieved by displaying each selected symbol as stopping independently while the remainder of the reel is displayed as continuing to rotate. In one example, symbols are selected for each reel independent of the symbol sequence. In other examples, symbols may be selected independently for a subset of reels.

In a first form, a stand alone gaming machine is provided wherein all or most components for implementing the game are present in a player operable gaming machine.

In a second form, a distributed architecture is provided wherein some of the components for implementing the game are present in a player operable gaming machine and some of the components for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisioned. For example, an architecture may be provided wherein a gaming machine is networked with a gaming server and the respective functions of the gaming machine and the gaming server are selectively modifiable. For example, the gaming system may operate in stand alone gaming machine mode, "thick client" mode, or "thin client" mode depending on the game being played, operating conditions, etc. Other variations will be apparent to persons skilled in the art.

A gaming system may be any electronic gaming machine (EGM) such as a slot machine, fruit machine, video Poker machine, Keno or Bingo machine, or any other electronic gaming device or terminal including a handheld electronic device or an electromechanical stepper machine. A gaming system may also include a live table game such as Blackjack, Pai Gow, or Baccarat, a multi-terminal gaming machine such as multi-terminal roulette, Sik Bo, Poker, dice games, and others that may be interfaced with a player tracking module and slot accounting system. As an example, a gaming table layout may be embodied as a video display. Thus, a gaming system, as used herein, includes gaming tables as well, and is not limited to any specific kind of gaming device.

A gaming system could also be implemented in a personal digital assistant, cell phone, mobile gaming, or any other gaming environment where gaming takes place using monetary based wagers, e.g., casino gaming, or for novelty gaming using promotional or valueless credits. Further, where games are connected to or interact with a large screen display, the features may be applied to the individual gaming machines or the large display.

A gaming system can provide primary or main game(s) and secondary or bonus/feature games to a player. Games can be provided via preconfigured storage at the gaming system, via download from an external source, and/or via server-based execution, for example. Games can be provided in response to certain player and/or casino actions, including but not limited to player tracking rewards, game play, casino promotions, tournament play, etc. Gaming systems can provide player and/or game play data to a management system and/or external monitor for player tracking, auditing, slot accounting, regulatory/licensing compliance, and/or other purpose, for example.

Irrespective of the form, the gaming system includes several core components. At the broadest level, the core components are a player interface 50 and a game controller 60 as illustrated in FIG. 1. The player interface 50 is arranged to enable manual interaction between a player and the gaming system and for this purpose includes the input/output components for the player to enter instructions and play the game.

Components of the player interface 50 may vary from embodiment to embodiment but will typically include a credit mechanism 52 to enable a player to input credits and receive payouts, one or more displays 54, a game play mechanism 56 that enables a player to input game play instructions, and a speaker 58.

The game controller 60 is in data communication with the player interface and typically includes a processor 62 that processes the game play instructions in accordance with game play rules and outputs game play outcomes to the display(s) 54. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g., a personal computer) or a server.

Figure 2:
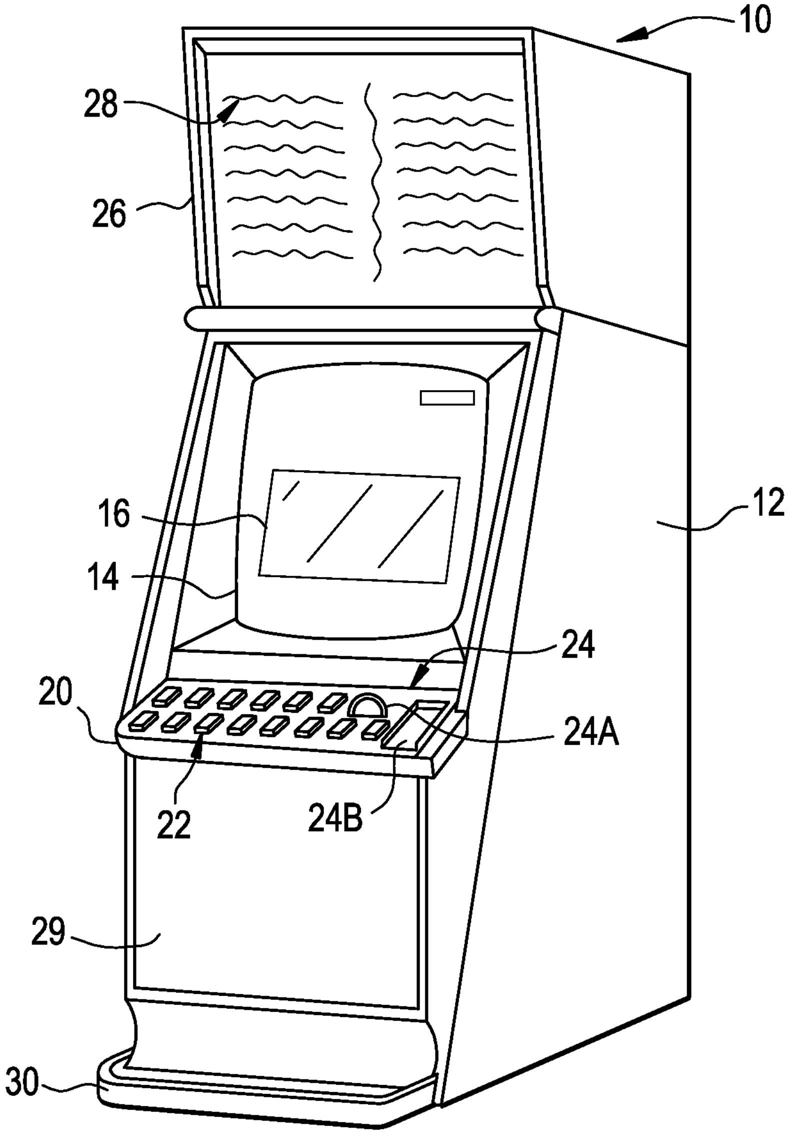
FIG. 2 is a perspective view of a gaming machine.

A gaming system in the form of a stand alone gaming machine 10 is illustrated in FIG. 2. The gaming machine 10 includes a console 12 having a video display 14 on which is displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill/voucher acceptor 24B. Other credit input mechanisms may also be employed, for example, a card reader for reading a smart card, debit card or credit card. A player tracking module may be provided having a reading device for the purpose of reading a player tracking device, for example as part of a loyalty program. The player tracking device may be in the form of a card with a machine readable element such as a magnetic stripe, flash drive, and/or any other portable storage medium capable of being read by the reading device, for example.

A top box 26 may carry artwork 28, including, for example, pay tables and details of bonus awards and other information and/or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube (CRT) screen device. Alternatively, the display 14 may be a liquid crystal display (LCD), plasma screen, any other suitable video display unit. The top box 26 may also include a display, for example, a video display unit, which may be of the same type as the display 14, or of a different type.

The display 14 may include a game display area and a surrounding border or background, for example. Where a transmissive display is used, the transmissive display may overlay all or part of the game display area on the display 14. Video displays (e.g., LCD, CRT, plasma, etc.) and/or other illuminating or light sources (e.g., lamps, light emitting diodes (LEDs), etc.) may also be integrated with spinning reels to illuminate or animate desired display locations such as pay lines, pay combinations, winning lines, winning combinations, special symbols, etc.

Lighting may also be used to backlight symbols and/or generating a flickering or flashing effect as the electro-mechanical reels spin, for example. In certain embodiments, one or more light sources may be used with one or more filters to adjust certain characteristics of light emitted by the one or more light sources (e.g., altering lamp light to simulate natural daylight), for example.

Figure 3:
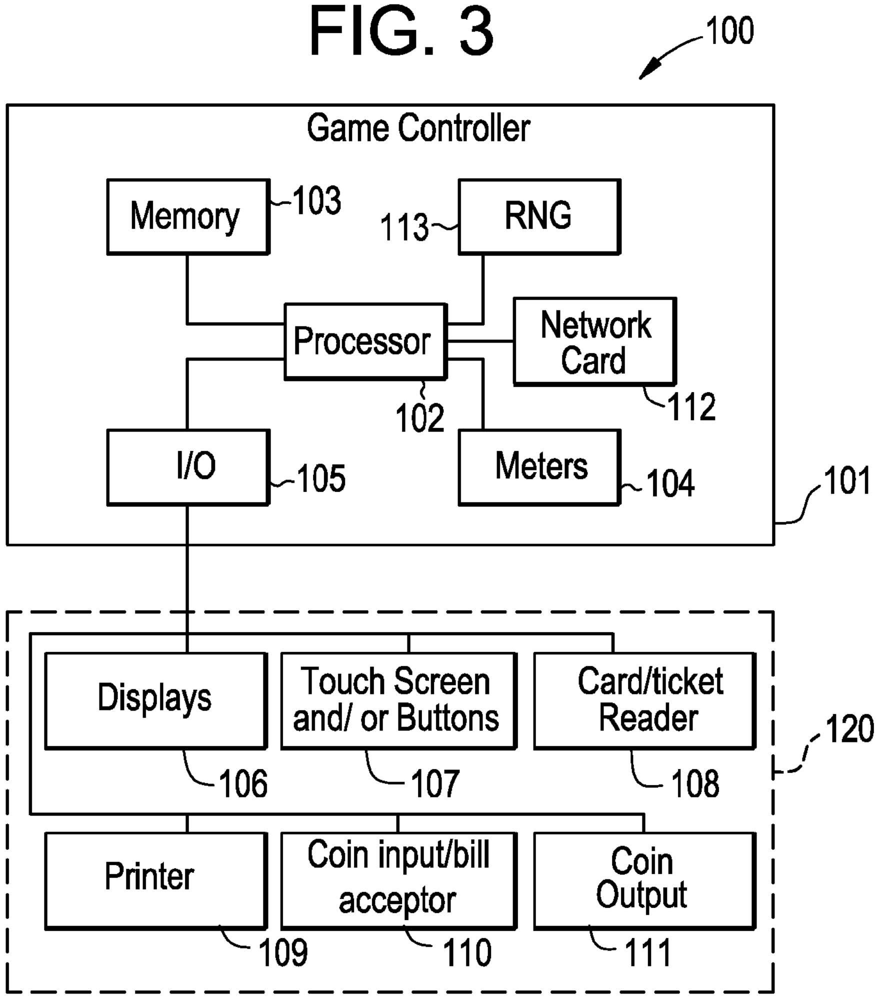
FIG. 3 is a block diagram of the functional components of a gaming machine.

FIG. 3 shows a block diagram of operative components of a typical gaming machine which may be the same as or different to the gaming machine of FIG. 2. The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, and an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted depending on the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
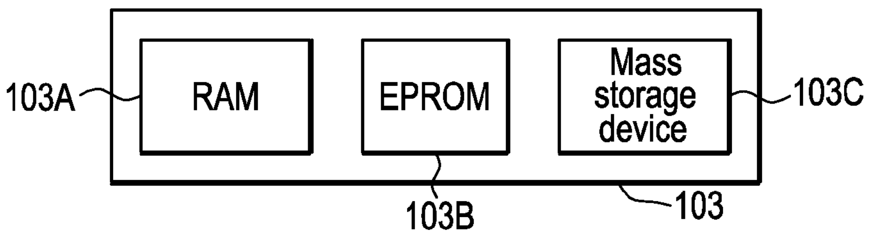
FIG. 4 is a block diagram representing the structure of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, such as, for example, providing input/output devices 106, 107, 108, 109, 110, 111 remotely from the game controller 101.

Figure 5:
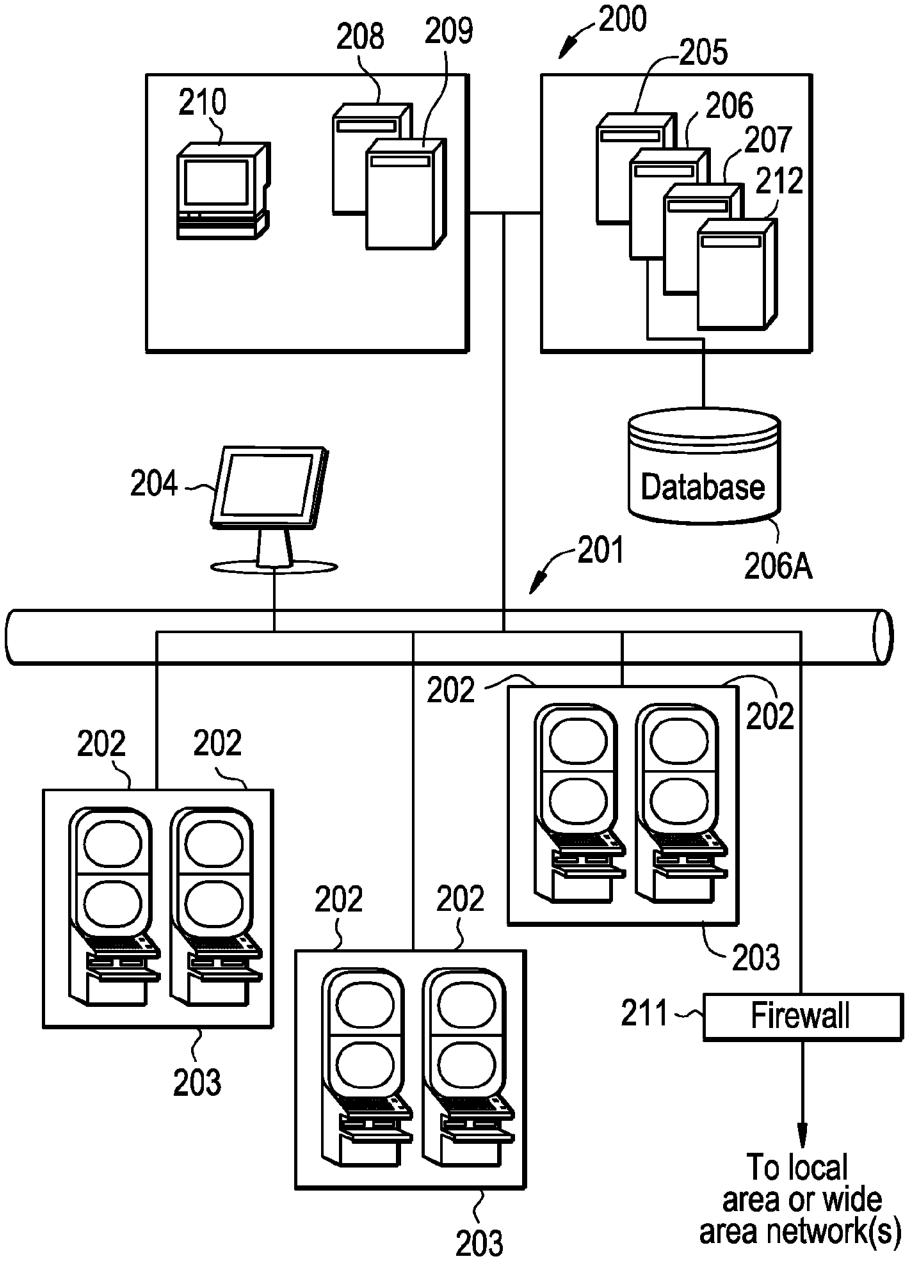
FIG. 5 is a diagram schematic of a networked gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisioned.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example, promotional or informational material.

In a thick client embodiment, game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming machines 202 in a database 206A. Typically, if the gaming system enables players to participate in a Jackpot game, a Jackpot server 207 will be provided to carry out the accounting in respect of the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games based on the terminals.

Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by downloading it from a server).

An embodiment provides a spinning reel type game. Spinning reel type games typically allow a player to select how many pay lines of a plurality of pay lines they will play in each game—i.e. a minimum of one pay line up to the maximum number of pay lines allowed by the game. Persons, skilled in the art, will appreciate that in other embodiments, the player may select a number of reels to play. In most games, each pay line is formed by a set of symbol positions consisting of one symbol position from each reel. That is, a symbol position within the display which corresponds to a reel is assigned to a selected pay line. The symbol positions that constitute each of the pay lines are usually advertised to the player by markings on the display or diagrams showing the symbol positions that correspond to each offered pay line. Some of the pay lines will be horizontal or diagonal lines but others may be other combinations of symbols. Typically, the pay lines will be constituted by symbol positions in the visible window. A game outcome is determined based on the symbols on each wagered upon, e.g. bought, pay line and a prize table that specifies awards. Many modern games have five reels and three symbols of each reel are displayed when the reels stop defining a 3×5 matrix of displayed symbols. It should be understood that based upon the layout of the game reels "symbols" can include graphic representations such as cherries, 7s or other graphic designs or may include "blanks" which are the absence of graphical designs on the reel. The number of reels and a number of symbols or reel stops on each reel may vary (e.g., three reels, four reels, six reels, four symbols per reel, five symbols per reel, etc.) defining different matrices.

In prior art implementations, the game controllers of such gaming machines select symbols by employing a stop determining function that randomly determines the stop position for each reel. For example, if there are five reels, each having twenty-two symbols, the stop determining function might determine that the stop positions are positions: 3, 13, 7, 9 and 17 for reels one through five. The spinning of the reels is then controlled so that each symbol designated by the stop position comes to a stop in the same row, typically a predetermined row in a "window" visible to the player on the display that corresponds to a player playing a single win line—e.g. the middle horizontal row. The other symbols that are visible in the display will be adjacent symbols in the symbol sequence—e.g. if the determined stop position is 3, then the symbols allocated to positions 2 and 4 (above and below the stop position 3) will also be visible if three symbols of each reel are displayed.

Figure 6:
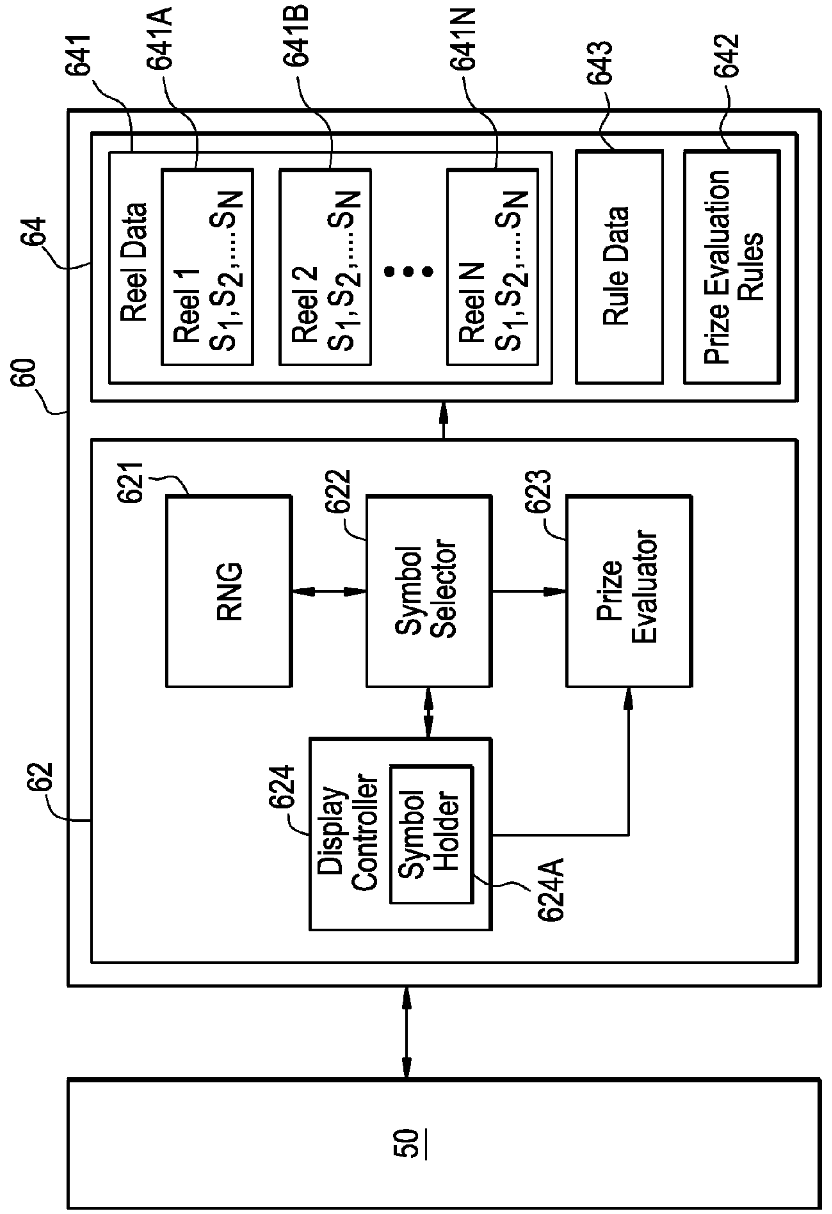
FIG. 6 is a further block diagram of the gaming system.

The game controller 60 of the embodiment is shown in more detail in FIG. 6. It will be apparent that the processor 62 implements a number of modules, for example random number generator module 621 by executing software routines. Persons skilled in the art will appreciate that not all modules need be implemented by processor 62. For example, the random number generator module 621 could be implemented by a separate circuit or by a random number generator server.

Referring to FIG. 6, in the embodiment, the symbol selector 622 is arranged to select a plurality of symbols for each reel independently of the symbol order $S_1$ to $S_N$ specified in the reel data of each reel, reel 1 to reel N 641*a*, 641*b*, 641*n*. For example, each reel defines a physical reel strip (for electromechanical reels) and a virtual reel strip for video reels having symbols laid out, in order, $S_1$ to $S_N$, The symbol selector 622 sends data which indicates the order in which the symbols of each reel were selected to the display controller 624. The display controller 624 controls display of spinning and stopping of the symbols of each reel. Accordingly, it includes a symbol holder function 624*a* which is arranged to control the display 54 for spinning and stopping of the symbols.

One example implementation includes five reels and three display positions for each reel as indicated by a 3×5 matrix of display positions. Accordingly, in an example where a reel contains symbols from $S_1$ to $S_{30}$, i.e. $S_1$ is the first symbol position, $S_{30}$ is the last and any other symbol in between such as $S_{10}$ represents the $10^{th}$ position in that reel strip. This reel is to spin within a reel column size displaying three symbols, one for each row.

Figure 7:
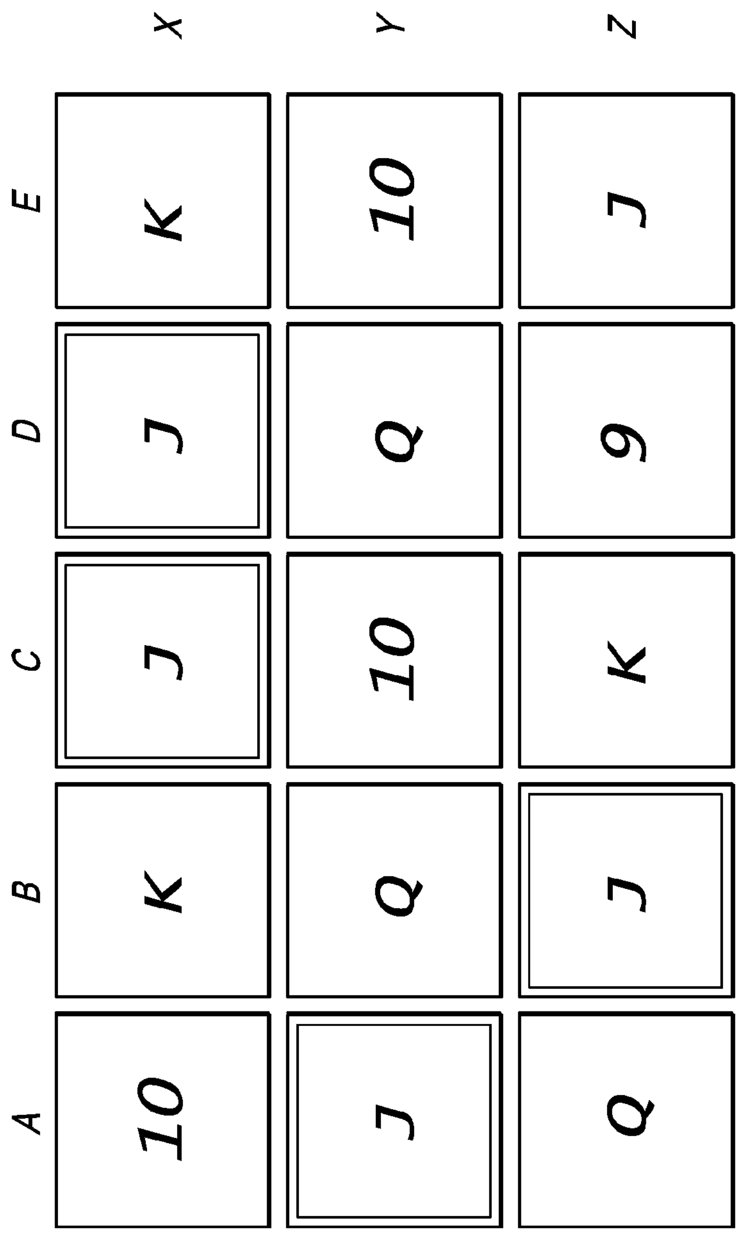
FIG. 7 depicts an example matrix of symbol positions for a gaming system display.

FIG. 7 depicts an example 5×3 matrix of symbol or reel display positions. Referring to the symbol positions by their matrix row and column designations (e.g., AX for the top left hand corner and EZ for the bottom right hand corner), it is noted that a top row includes symbol positions AX, BX, CX, DX, and EX. A bottom row includes symbol positions AZ, BZ, CZ, DZ, and EZ. Symbols may randomly, pseudo-randomly, and/or otherwise appears in the symbol positions of the displayed 3×5 matrix of FIG. 7. Symbols may appear as simulated spinning and stopping reels on a video or other graphical display, for example. Symbols may be represented on electro-mechanical spinning reels (e.g., stepper reels) with or without a graphical overlay, for example.

To operate a gaming system, a provision is made for a player to enter a wager (money wager, wager of accumulated credits, etc.) and select symbol arrangements (pay lines or reels) upon which to wager and for prompting the gaming system to generate and display an outcome at a content display. If the outcome on any wagered upon arrangement is a winning outcome, the player is awarded credits, coins, tokens, vouchers, etc. If the outcome is a losing outcome the player receives no award. A winning outcome may be embodied as one, two or more symbols in the display (i.e. scatter awards) or may be embodied as predetermined combinations of symbols appearing in a wagered upon, e.g. bought up, symbol arrangement such as on an enabled (wagered upon) pay line.

The outcome may be determined, for example, by the combination of symbols which appear in the display matrix. Each of the displayed five spinning reels displays a plurality of symbols, and when stopped presents one or more symbols in the display. The symbols displayed may be associated with pay lines and/or may represent "scatter" wins (a predetermined number of symbols displayed anywhere in the game display), for example. Five symbols may appear along each horizontal "line" or row of the display. For example, the middle row may be the row wagered upon and upon which the outcome is determined. The top row and the bottom row also have symbols and form two other pay line combinations of five symbols, which may be used to determine wins. Thus, a three-by-five matrix defining an array symbols appears as the content display.

Traditionally, pay lines are established for horizontal rows in the display matrix. However, modern games with up to fifty pay lines have been disclosed in U.S. Pat. No. 5,580,053 issued Dec. 3, 1996, to Crouch.

Game symbols are selected and displayed from a predetermined universe of symbols as set by the game designer. These symbols may be symbols which are common to numerous games as well as symbols which are unique to the individual game and reflect the overall theme of the game. As such, the symbols can have various shapes and colors or combinations of colors. For example, a symbol may be a brown horse with a red saddle, a bald eagle having the colors of white and grey, a human figure having flesh tones and blue clothing and so forth. Thus each symbol has a shape and a color (or multi-color) characteristic. In the display of a game outcome (or partial outcome) with a 5×3 matrix, as shown in FIG. 7, there would be a display of fifteen symbols, some of which may appear only once in the display and some which may appear multiple times in the display.

In a multi-reel, video slot machine there may be more than twenty different symbols in the universe of game symbols. These symbols or symbol combinations are randomly selected by known means such as an approved random number generator (RNG) for display on the five reels.

Figure 8:
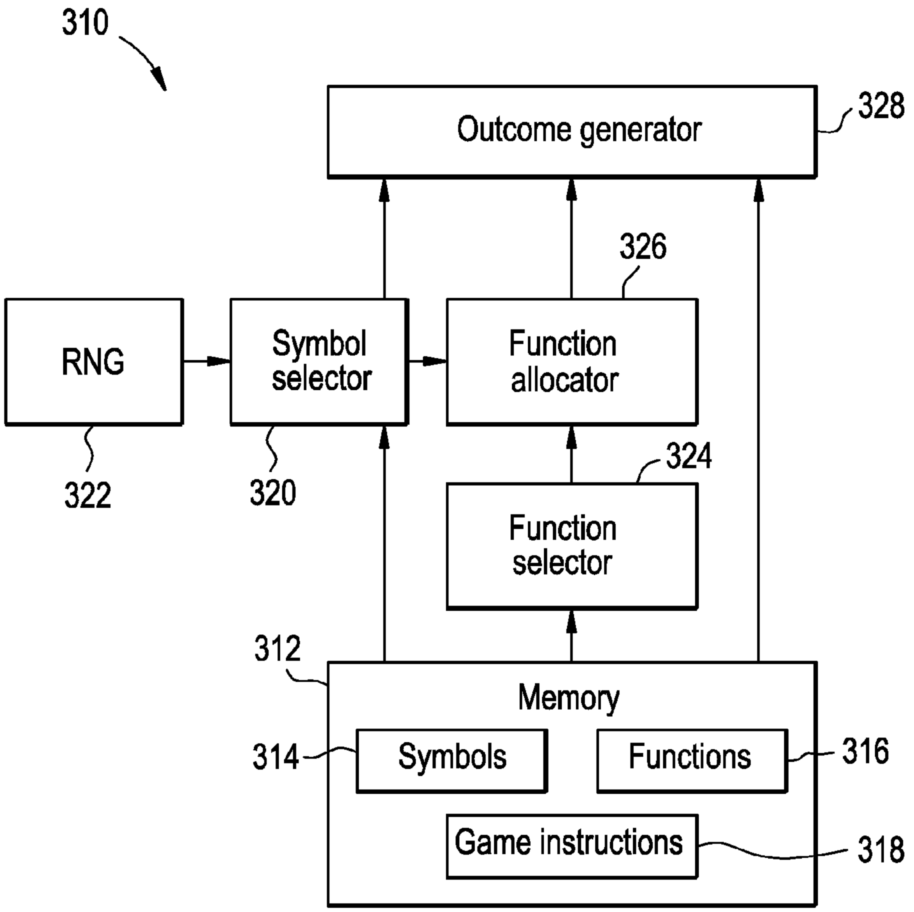
FIG. 8 shows a logical representation of a gaming system.

FIG. 8 shows a logical representation of a gaming system 310 arranged to implement a probabilistic game of the type wherein several symbols from a set of symbols are randomly displayed and a game outcome is determined on the basis of the displayed symbols. With some such probabilistic games, the set of symbols include standard symbols at least one of which is a function symbol, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display in the same line, scattered, and so on. The function associated with a function symbol may be for example a wild function wherein display of the function symbol is treated during consideration of the game outcome as any of the standard symbols. A function symbol may be represented as the word "WILD", a star, or by any other suitable word or symbol. Other functions are also envisaged such as scatter functions, multiplier functions, repeat win functions, jackpot functions and feature commencement functions.

The gaming system 310 operates such that one or more function symbols can effectively be added during a game so as to modify the probability of occurrence of a win outcome and thereby enhance player interest in playing the game. This is achieved by selecting one or more symbols to acquire a new function and determining game outcomes based on displayed symbols and the new function. The function acquired by a symbol may be in place of or in addition to any function already associated with the symbol.

Referring to FIG. 8, the gaming system 310 comprises a memory 312 arranged to store symbol data 314 indicative of a plurality of symbols for subsequent display to a player, function data 316 indicative of one or more functions allocatable to the symbols, and game instruction data 318 indicative of game instructions usable by the gaming machine 310 to control operation of the game.

The gaming system 310 also includes a symbol selector 320 which is arranged to select several symbols for display to a player and in some game circumstances to select one or more symbol to which a function is to be allocated. In this example, the selection carried out by the symbol selector 320 is made using a random number generator 322.

It will be appreciated that the random number generator 322 may be of a type which is arranged to generate pseudo random numbers based on a seed number, and that in this specification the term "random" will be understood accordingly to mean truly random or pseudo random.

The gaming system 310 also comprises a function selector 324 arranged to select one or more functions for allocation to one or more symbols selected during the special game circumstances, and a function allocator 326 arranged to allocate the or each function selected by the function selector 324 to one or more symbols selected during the special game circumstances. The function selector 324 may be arranged to randomly select a function or to select a function on the basis of a predefined rule.

The gaming system 310 also comprises an outcome generator 328 which in accordance with the game instructions 318 determines game outcomes based on the symbols selected for display to a player by the symbol selector 320, and on the basis of the function(s) allocated to one or more selected symbols, if any.

In the embodiments described below, the symbol selector 320, the function selector 324, the function allocator 326, and the outcome generator 328 are at least partly implemented using a microprocessor, although it will be understood that other implementations are envisioned.

The gaming system 310 can take a number of different forms, as described above.

In certain example embodiments, separation between interests and activities of table players and slot players is addressed by incorporating the two types of play into one game. That is, certain players enjoy table games while other players enjoy slot and/or video poker games. Certain embodiments combine features of table games with features of slot/video poker games to offer a new variety of games to players.

In certain embodiments, a set of symbols appears on one or more displayed video and/or electromechanical reels of a gaming system. One or more of the reels or one or more symbol stops within one or more of the reels is assigned to be the "dealer". Others of the reels and/or reel stops are assigned to the player (or "non-dealer" reels). Then, symbols on the non-dealer reels are trying to cooperate with and/or compete against the special set of symbols on the dealer reel(s) to make one or more winning combinations for the player.

For example, an additional blackjack game can be included in a 5-reel video slot game. A sixth reel is designated as the dealer reel and includes a set number of representations of playing cards. Random cards are displayed on each of the reels in the 5-reel video slot game. When any of these cards appear (e.g., is "spun up") in the 5-reel video slot game, the displayed card on the 5-reel slot is compared to the card(s) on the sixth "dealer" reel. A prize can be awarded based on how close to twenty-one (21) the player comes for each of these pairings. An additional prize can be awarded if the card spun up on the 5-reels and the card on the sixth reel totals a blackjack. In addition, these cards can have an additional scatter pay attached to them, for example Thus, a table game of blackjack and dealer play can be incorporated into a video slot or poker game.

Figure 9:
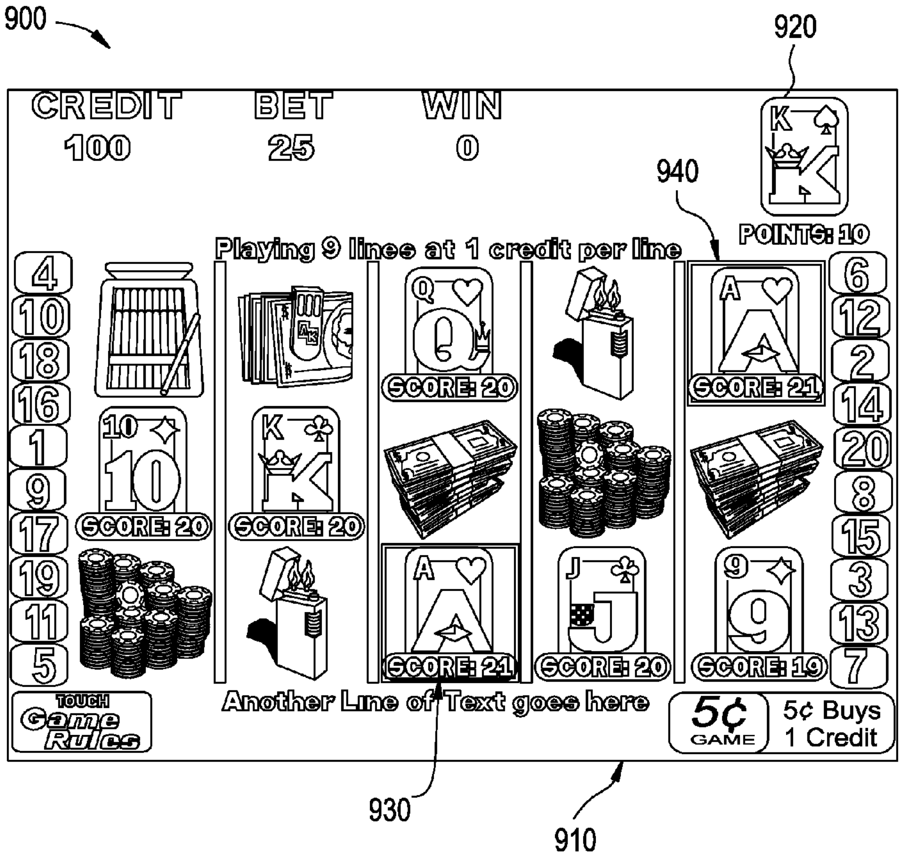
FIG. 9 illustrates an example display of a gaming system having a cooperative reel game according to an embodiment of the present invention.

As illustrated, for example, in FIG. 9, a five reel slot machine game 900 involving a 5×3 matrix 910 of symbol positions includes a sixth reel which is configured to randomly select and display a dealer symbol 920. The dealer symbol 920 is used in cooperation with symbols in the 5×3 matrix 910 to form a blackjack or score of twenty-one for award of a prize. As shown in FIG. 9, the dealer symbol 920 is a King, which combines with Aces at symbol positions 930 and 940 to result in two blackjacks. Winning combinations formed in conjunction with the dealer symbol 920 can result in a variety of outcomes including free games, free credits, one or more monetary awards, entry into bonus or secondary games, etc.

Figure 10:
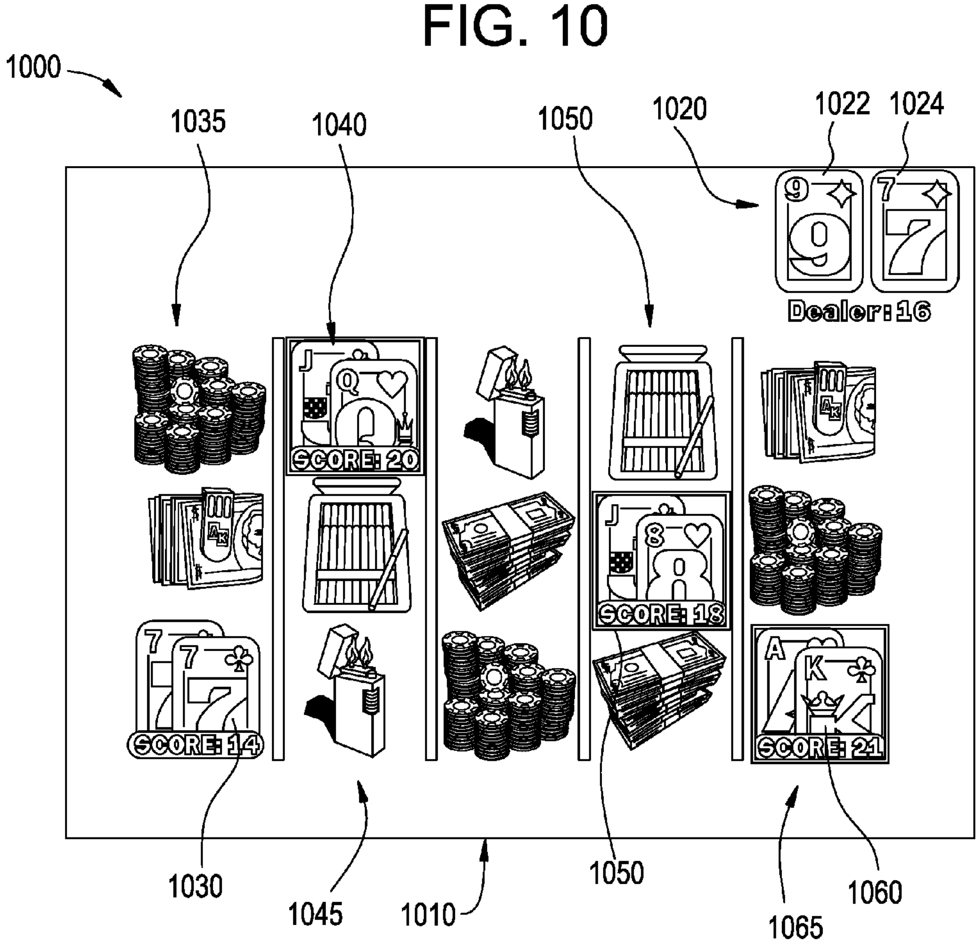
FIG. 10 shows another example display of a gaming system having a cooperative reel game according to an embodiment of the present invention.

FIG. 10 depicts another example of a five reel slot machine game 1000 having a 5×3 matrix 1010 of symbol positions and a dealer symbol area 1020 where randomly selected cards are displayed as one or more symbols 1022, 1024. Results in the dealer symbol area 1020 are used in competition with symbols in the player's 5×3 matrix 1010. In the example shown in FIG. 10, a blackjack game is played as a primary and/or bonus game on the 5 reel slot or video poker machine. Symbols in the 5×3 matrix 1010 are compared to symbols in the dealer symbol area 1020 to determine whether the player or the dealer is the winner.

In the example shown in FIG. 10, a symbol combination of two Seven's 1030 in a first column 1035 is less than a combination of Nine and Seven in the dealer symbol area 1020. However, a symbol combination of a Jack and a Queen 1040 in a second column 1045, a combination of a Jack and an Eight 1050 in a fourth column 1055, and a combination of an Ace and a King 1060 in a fifth column 1065 of the 5×3 matrix 1010 are greater than the combination score of sixteen in the dealer symbol area 1020 without going over a score of twenty-one.

As shown in FIGS. 9 and 10, the dealer symbol(s) 920, 1022, 1024 are represented in a separately sixth dealer "reel" or symbol position. In certain embodiments, the dealer symbol(s) can be one or more existing symbols from the 5×3 matrix. For example, the dealer symbol 920 could be the first symbol of the first reel in the matrix 910. In certain other embodiments, the dealer symbol(s) can be an overlay graphic on one or more player reels (e.g., generated on a transmissive reel display). The dealer symbol(s) can be displayed in a top screen, for example. In certain embodiments, a bank of machines may allow more than one person to play in cooperation with and/or competing against the "dealer".

Dealer symbol(s) are randomly selected as are the player reel stop symbols. Dealer and non-dealer symbols can be randomly (or pseudorandomly) generated according to any of a number of available techniques, for example. For example, one technique is to select the symbols at random from a set of available symbols sorted in memory 103. The dealer and non-dealer symbols can be selected using any of a variety of known techniques for selecting symbols for a spinning reel type game, for example. Other techniques can be used to control the odds of particular outcomes occurring to thereby control a return to the player of the game. For example, it is known to randomly determine the outcome and then map the outcome to a symbol combination.

A cooperative reels game can be provided as a base game, a bonus game, and/or other feature game, for example. If implemented as bonus game, for example, a special dealer symbol can be used. If a player gets dealer symbols on reels 1, 3, and 5, for example, the bonus game is triggered for play by the player. In certain embodiments, a cooperative game can be implemented as a bonus game randomly. In certain other embodiments, a cooperative game can be implemented as a bonus game upon a certain bet (e.g., a max bet).

In certain embodiments the Blackjack cards are displayed at or over the base game set of symbols. The display of the cards may be triggered by symbols in the base game appearing in the display or randomly or based upon the outcome of a sixth reel. The Blackjack cards may also be displayed adjacent to the reels, e.g., on a video display overlaying, below or above electromechanical reels. As a further feature to play the cooperative reel game may require an additional wager in addition to the wager to play the base game.

Combining dealer symbol(s) with non-dealer symbols can help provide a more competitive feel to a slot or video poker machine game. Adding a table game element helps impart a competitive feeling of playing against someone or something else, for example. An extra reel and/or symbol set is displayed to the player and interacts with the player's traditional set of reels and reel stops, for example.

Persons skilled in the art will appreciate that in some embodiments the player may be required to operate a touch screen and/or buttons 107 to facilitate game play, for example. For example, where the card symbols on a reel have a score of, for example, fourteen such as shown in FIG. 10 on the first reel, the player may opt to stand with the score, hit (receive another card), double down, split or take any other action permitted by the rules of the game, by using the touch screen or game control buttons.

Figure 11:
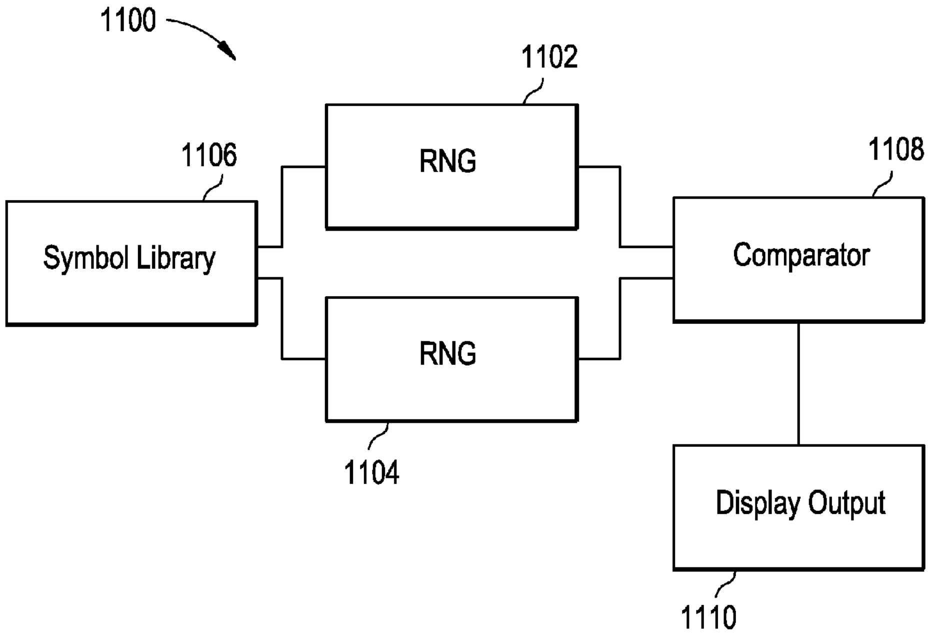
FIG. 11 illustrates a block diagram of a gaming system implementing and executing a cooperative reels game according to one or more embodiments of the present invention.

FIG. 11 illustrates a block diagram of a gaming system 1100 implementing and executing a cooperative reels game according to one or more embodiments of the present invention. The system 1100 includes a dealer RNG 1102, a non-dealer RNG 1104, a symbol library 1106, a comparator 1108, and a display output 1110. In certain embodiments, the dealer RNG 1102 and the non-dealer RNG 1104 can be implemented as a single random number generator. The components of the system 1100 can be implemented in hardware, software, and/or firmware separately and/or in various combinations, for example.

The RNG 1102 generates one or more dealer symbols using the symbol library 1106. The RNG 1104 also generates one or more non-dealer (i.e., a player) symbols using the symbol library 1106. Symbols can be assigned a number and/or range of numbers for selected by the RNG 1102, 1104, for example.

The comparator 1108 compares/sums the dealer and non-dealer symbols to determine an outcome(s). The comparator 1108 can be used to look for a better combination of symbols among the set of dealer symbols and the set of non-dealer symbols. The comparator 1108 can be used to look for a combination formed by both the dealer symbol(s) and non-dealer symbol(s) in cooperation. Comparison rules may vary depending upon game parameters and/or rules, for example (e.g., base game, feature game, tournament mode, etc.).

In certain embodiments, a cooperative/comparative outcome between the dealer and non-dealer symbols can be an additional outcome apart from a payline-based or win-pattern based outcome and/or result from displayed symbols on a matrix of reels or a grid of symbols, for example. In certain embodiments, the dealer symbols can be generated on a separate device apart from a spinning reel game to provide a separate game and set of outcomes, for example.

The comparator 1108 result helps to form the display output 1110, which utilizes a graphic display driver to cause symbols to be displayed on a screen, such as a primary or secondary display on a gaming machine. Symbols can be moved in sequence downwardly in the reels, for example, to provide an appearance of spinning reels which are then stopped. The display output 1110 can be provided on, for example, electromechanical reels, an overlay over electromechanical reels, a video display simulating reels, a video display providing a matrix of symbol positions such as a 3×5, 5×5, 4×4, etc. matrix of symbols positions. In certain embodiments, a player can employ an interface device such as a handle, button(s), and/or a touch screen, to initiate game play, stop reel spins, and/or otherwise interact with the displayed game. A player can use the interface device, for example, to select win lines or pay lines in the game display.

Figure 12:
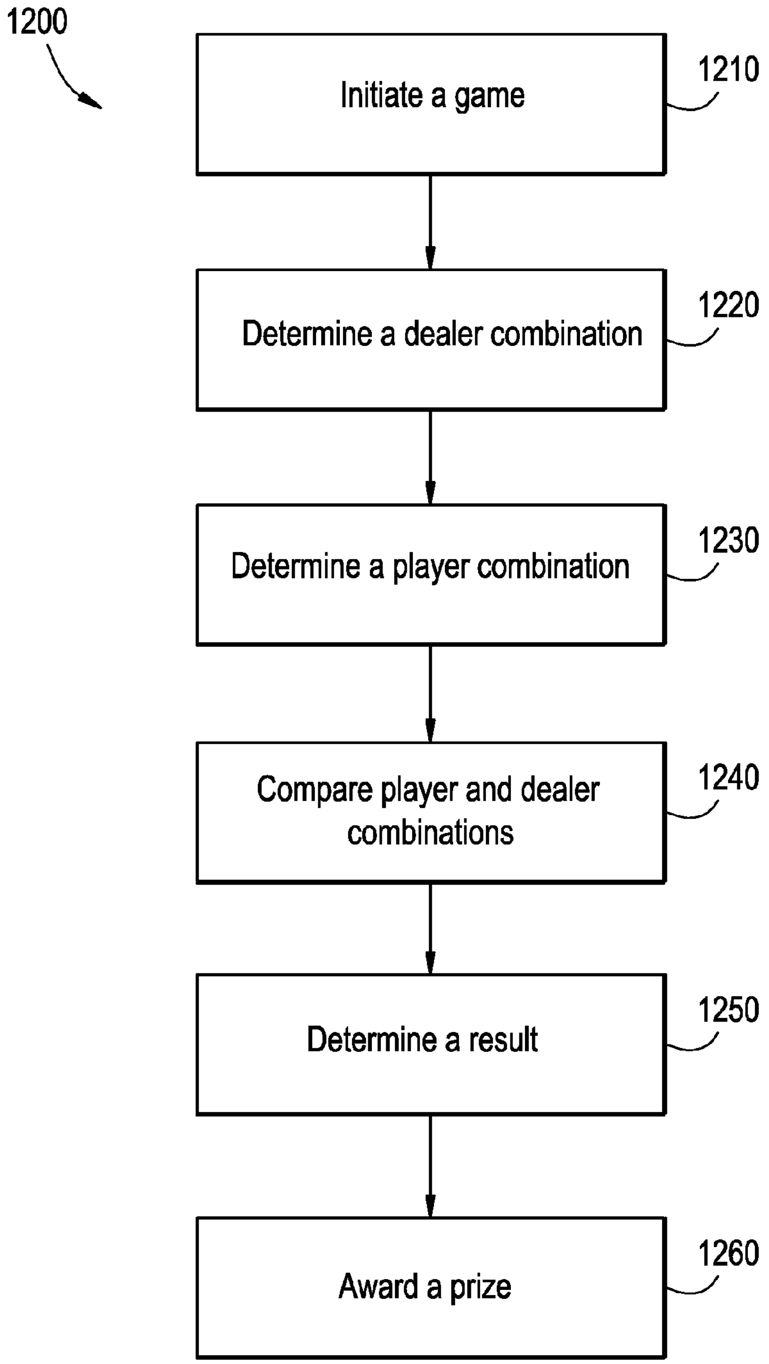
FIG. 12 depicts a flow diagram for a method for cooperative reel game play in accordance with certain embodiments of the present invention.

FIG. 12 depicts a flow diagram for a method 1200 for cooperative reel game play in accordance with certain embodiments of the present invention.

At 1210, a game is initiated. The game can be a spinning reel game occurring on a 5×3 video matrix, for example. The game can be initiated by a triggering event, such as a button press, a touch screen push, a handle pull, etc. In certain examples, the game is automatically initiated by a game controller and/or game software program. In other example, a wager may be required to initiate game play, for example. As stated above, additional wager(s) may be required to initiate the comparative reel feature.

At 1220, a dealer combination of one or more symbols is determined. For example, a random number generator and/or other outcome-determination method and/or device can determine values for one or more symbols assigned to be the dealer symbols. The dealer symbol(s) can be implemented on separate reel(s) and/or symbol position(s) and/or may be part of the set of reel(s) and/or symbol position(s) used by the player.

At 1230, a player combination of one or more symbols is determined. For example, a random number generator and/or other outcome-determination method and/or device can determine values for one or more symbols associated with the player. As discussed above, these symbol(s) may be separate and/or shared with the dealer symbol(s).

At 1240, the player combination is compared to the dealer combination. For example, selected symbol(s) in the player combination are compared to (or matched with) symbol(s) in the dealer combination to determine which combination is better (e.g., who has the better hand of card symbol(s). As another example, selected symbol(s) in the player combination are combined with symbol(s) in the dealer combination to determine whether a winning combination of symbols results.

At 1250, a result is determined. Thus, for example, if the player combination is better than the dealer combination, then the player wins, and vice versa. As another example, if the player combination in conjunction with the dealer combination provides a winning outcome or score according to a predetermined winning Blackjack hand score, the player wins.

At 1260, a prize is awarded, if applicable, to the player. That is, if one or more of the outcomes provide a winning combination to the player, a prize is awarded to the player. The prize can include money, credit, a voucher, food, transportation, lodging, entertainment, a bonus game, etc. The prize from the cooperative reels can be in conjunction with another base game and/or bonus prize, for example.

One or more of the steps of the method 1200 may be implemented alone or in combination in hardware, firmware, and/or as a set of instructions in software, for example. Certain examples may be provided as a set of instructions residing on a computer-readable medium, such as a memory, hard disk, DVD, or CD, for execution on a general purpose computer or other processing device.

While the description above is directed to a combination reel Blackjack game, it could also be directed to games such as Baccarat, Stud Poker, Three Card Poker or other game. For example in a Baccarat embodiment Player(s) and Dealer's hands would be randomly selected and displayed according to the rules of Baccarat.

Certain examples may omit one or more of these steps and/or perform the steps in a different order than the order listed. For example, some steps may not be performed in certain examples. As a further example, certain steps may be performed in a different temporal order, including simultaneously, than listed above.

Other variations would be apparent to persons skilled in the art and should be considered as falling within the scope of the invention described herein. In particular, further embodiments can be formed from the features described above.

In the claims which follow and in the preceding description of the invention, except where the context indicates otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Further aspects of the method will be apparent from the above description of the gaming system. Persons skilled in the art will also appreciate that the method could be embodied in program code. The program code could be supplied in a number of ways, for example on a computer readable medium, such as a disc or a memory (for example, that could replace part of memory 103) or as a data signal (for example, by downloading it from a server).

It is to be understood that, if any prior art publication is referred to herein, such reference does not constitute an admission that the publication forms a part of the common general knowledge in the art, in Australia or any other country.

Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Method steps associated with certain embodiments may be implemented in one embodiment by a program product including machine-executable instructions, such as program code, for example in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represents examples of corresponding acts for implementing the functions described in such steps.

The invention claimed is:

1. A method of gaming using a gaming system that includes a credit mechanism, a player interface, and a game controller, said method comprising:

receiving, by the credit mechanism, credit input by a player to establish a credit balance;

receiving, by the player interface, game instructions input by the player to make a wager from the credit balance to initiate a game comprising a reel-based game and a card-based game;

selecting, by the game controller, a plurality of first symbols for display in a plurality of columns that each include a plurality of player display positions of the reel-based game;

determining, by the game controller, an outcome of the reel-based game based on the plurality of first symbols;

selecting, by the game controller, a second symbol for display in a dealer display position;

comparing, by the game controller, the second symbol in a one-to-many relationship to each of the plurality of first symbols displayed in each of the plurality of columns to initiate the card-based game;

determining, by the game controller, a winning outcome based upon the comparing; and displaying, by the game controller via the player interface, the winning outcome for player view using the player interface.

2. A method as recited in claim 1, wherein the plurality of first symbols represent cards in a player hand of Blackjack and the second symbol represents cards in a dealer hand of Blackjack and the player hand and the dealer hand are compared to determine whether the player beats the dealer in the video blackjack.

3. A method as recited in claim 1, wherein comparing the plurality of first symbols and the second symbol further comprises combining one or more symbols of the plurality of first symbols with the second symbol to determine whether the plurality of first symbols includes a winning combination in view of the second symbol.

4. A method as recited in claim 3, wherein the plurality of first symbols represent cards in a hand of video blackjack and the second symbol represents a card in a hand of video blackjack and the plurality of first symbols and the second symbol are combined in cooperation to determine whether a winning combination is achieved.

5. A method as recited in claim 1, wherein the game is a reel-based symbol game and wherein the plurality of first symbols and the second symbol represent one or more symbols on the displayed reels.

6. A method as recited in claim 5, wherein the plurality of first symbols and the second symbol reside on separate reels.

7. A method as recited in claim 5, wherein the plurality of first symbols and the second symbol reside on a same set of reels.

8. A method as recited in claim 1, further comprising awarding a prize to the player based on the winning outcome.

9. A method as recited in claim 1, wherein at least one of the plurality of first symbols and the second symbol is randomly generated.

10. A non-transitory computer readable medium comprising computer program code which when executed by a game controller included in a gaming system that further includes a credit mechanism and a player interface, implements a method of gaming, said method comprising:

receiving, by the credit mechanism, credit input by a player to establish a credit balance;

receiving, by the player interface, game instructions input by the player to make a wager from the credit balance to initiate a game comprising a reel-based game and a card-based game;

selecting, by the game controller, a plurality of first symbols for display in a plurality of columns that each include a plurality of player display positions of the reel-based game;

determining, by the game controller, an outcome of the reel-based game based on the plurality of first symbols;

selecting, by the game controller, a second symbol for display in a dealer display position;

comparing, by the game controller, the second symbol in a one-to-many relationship to each of the plurality of first symbols displayed in each of the plurality of columns to initiate the card-based game;

determining, by the game controller, a winning outcome based upon the comparing; and displaying, by the game controller via the player interface, the winning outcome for player view using the player interface.

11. A non-transitory computer readable medium as recited in claim 10, further comprising combining one or more of the plurality of first symbols with the second symbol to determine whether the plurality of first symbols includes a winning combination in view of the second symbol.

12. A game controller comprising a processor configured to:

receive, by a credit mechanism coupled to said game controller, credit input by a player to establish a credit balance;

receive, by a player interface coupled to said game controller, game instructions input by the player to make a wager from the credit balance to initiate a game comprising a reel-based game and a card-based game;

select, by the game controller, a plurality of first symbols for display in a plurality of columns that each include a plurality of player display positions of the reel-based game;

determine, by the game controller, an outcome of the reel-based game based on the plurality of first symbols;

select, by the game controller, a second symbol for display in a dealer display position;

compare the second symbol in a one-to-many relationship to each of the plurality of first symbols displayed in each of the plurality of columns to initiate the card-based game;

determine a winning outcome based upon the comparison; and display, by the game controller via the player interface, the winning outcome for player view using the player interface.

13. A game controller as recited in claim 12, wherein the plurality of first symbols represent cards in a hand of video blackjack and the second symbol represents a card in a hand of video blackjack and the player hand and the dealer hand are compared to determine whether the player beats the dealer in the video blackjack.

14. A game controller as recited in claim 12, wherein the game controller compares the plurality of first symbols and the second symbol by combining one or more symbols of the plurality of first symbols with the second symbol to determine whether the plurality of first symbols includes a winning combination in view of the second symbol.

15. A game controller as recited in claim 14, wherein the plurality of first symbols represent cards in a hand of video blackjack and the second symbol represents a card in a hand of video blackjack and the player hand and the dealer hand are combined in cooperation to determine whether a winning combination is achieved.

16. A game controller as recited in claim 12, wherein the game is a reel-based symbol game and wherein the plurality of first symbols and the second symbol represent one or more symbols on the displayed reels.

17. A game controller as recited in claim 16, wherein the plurality of first symbols and the second symbol reside on separate reels.

18. A game controller as recited in claim 16, wherein the plurality of first symbols and the second symbol reside on a same set of reels.

19. A game controller as recited in claim 12, wherein the game controller awards a prize to the player based on the winning outcome.

20. A game controller as recited in claim 12, wherein at least one of the plurality of first symbols and the second symbol is randomly generated.

21. A gaming system comprising:

a credit mechanism configured to receive credit input by a player to establish a credit balance;

a player interface comprising a display for viewing by a player, the player interface configured to receive game instructions input by the player to make a wager from the credit balance to initiate a game comprising a reel-based game and a card-based game;

a game controller configured to:

select a plurality of first symbols for display in a plurality of columns that each include a plurality of player display positions of the reel-based game;

determine an outcome of the reel-based game based on the plurality of first symbols;

select a second symbol for display in a dealer display position;

compare the second symbol in a one-to-many relationship to each of the plurality of first symbols displayed in each of the plurality of columns to initiate the card-based game;

determine a winning outcome based upon the comparison;

display the winning outcome on the player interface for player view.

22. A gaming system as recited in claim 21, wherein the plurality of first symbols represent cards in a hand of video blackjack and the second symbol represents a card in a hand of video blackjack and the player hand and the dealer hand are compared to determine whether the player beats the dealer in the video blackjack.

23. A gaming system as recited in claim 21, wherein the game controller compares the plurality of first symbols and the second symbol by combining one or more symbols of the plurality of first symbols with the second symbol to determine whether the plurality of first symbols includes a winning combination in view of the second symbol.

24. A gaming system as recited in claim 23, wherein the plurality of first symbols represent cards in a hand of video blackjack and the second symbol represents a card in a hand of video blackjack and the player hand and the dealer hand are combined in cooperation to determine whether a winning combination is achieved.

25. A gaming system as recited in claim 21, wherein the game is a reel-based symbol game and wherein the plurality of first symbols and the second symbol represent one or more symbols on the displayed reels.

26. A gaming system as recited in claim 25, wherein the plurality of first symbols and the second symbol reside on separate reels.

27. A gaming system as recited in claim 25, wherein the plurality of first symbols and the second symbol reside on a same set of reels.

28. A gaming system as recited in claim 21, wherein the game controller awards a prize to the player based on the winning outcome.

29. A gaming system as recited in claim 21, wherein at least one of the plurality of first symbols and the second symbol is randomly generated.

30. A gaming system as recited in claim 21, wherein the game controller further comprises:

a random number generator configured to determine the plurality of first symbols and the second symbol; and a comparator configured to compare the plurality of first symbols and the second symbol to determine a result.

31. A gaming system as recited in claim 30, wherein the random number generator comprises a first random number generator configured to determine the plurality of first symbols and a second random number generator configured to determine the second symbol.

32. A gaming system as recited in claim 30, wherein the player interface comprises at least one of a set of electromechanical reels, a video display, and an overlay with respect to a set electromechanical reels.

* * * * *